July 25, 1944.  F. R. SIAS  2,354,618
INDICATOR
Filed Nov. 9, 1942
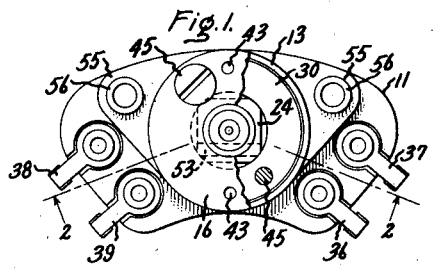
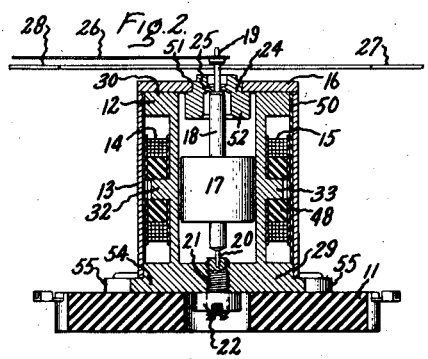
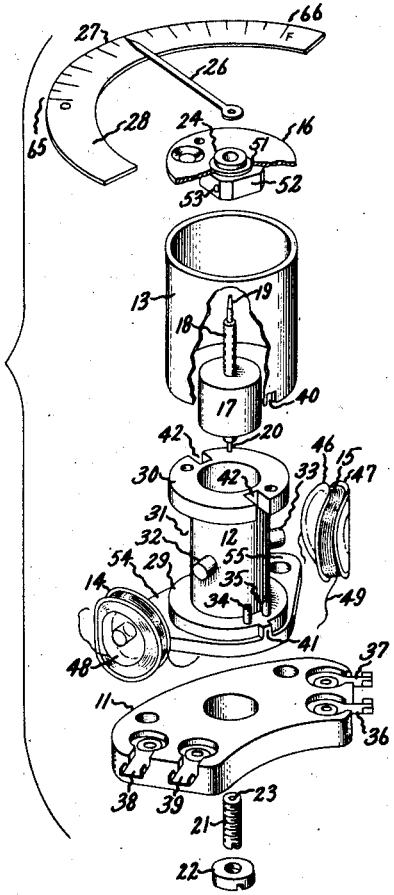
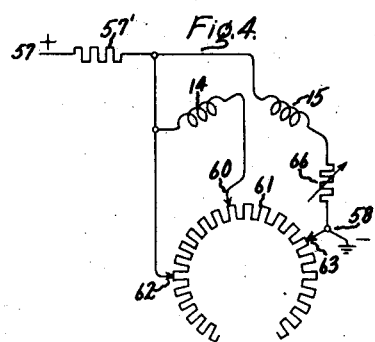
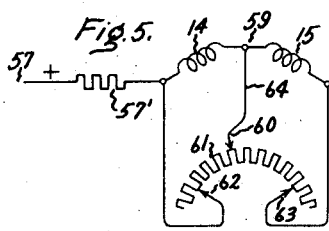
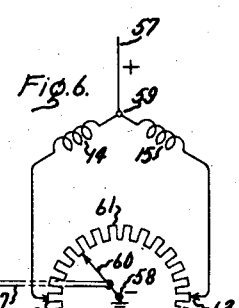
Inventor:
Frederick R. Sias,
by Harry E. Dunham
His Attorney.

Patented July 25, 1944

2,354,618

UNITED STATES PATENT OFFICE 2,354,618

INDICATOR

Frederick R. Sias, Marblehead, Mass., assignor to General Electric Company, a corporation of New York Application November 9, 1942, Serial No. 465,081

3 Claims. (Cl. 171—95)

My invention relates to telemetering systems and concerns particularly arrangements for electrically transmitting mechanical motions, either of rotation or deflection.

It is an object of my invention to provide a sturdy, reliable, compact receiver or indicator for remote indicating or telemetering systems.

It is an object of my invention to provide a telemeter receiver or electrical ratio indicator in which the angular length of the scale may be adjusted and in which the angular positions of the scale ends may be adjusted independently of each other. The telemetering system as such described in this application is claimed in a divisional application Serial No. 499,542, filed August 21, 1943.

A further object of my invention is to provide a telemetering system of the type having a variable resistance or potentiometer with a sliding brush to serve as a transmitter, and to provide a receiver for such a system, in which there is no danger of false scale indication in the case of a break in brush connections or bad contact.

It is also an object of my invention to provide such a system and a receiver therefor in which a change in the transmitter resistance has relatively little effect on the calibration curve of the receiver, in which a given transmitter may be used with a brush movement, representing transmitter scale length, varying from approximately 90 degrees to 240 degrees without serious departure from straight line calibration of the receiver, and in which the operation and the torque characteristics of the receiver may readily be predicted by graphical solution.

A further object of the invention is to eliminate the danger of false indications in case of power failure.

Other and further objects and advantages will become apparent as the description proceeds.

In carrying out my invention in its preferred form I provide a receiver or indicator having a pair of current-conducting coils mounted at an angle to each other in inductive relation to a rotor and electrically connected to a transmitter, comprising a resistor having a pair of adjustable taps for varying the transmitter scale length and having a sliding brush or tap which is moved along the resistor in accordance with variations in the indications to be transmitted. One of the taps is connected to a current source at its line terminal and the other is grounded, the current source having a grounded terminal. One of the receiver coils is electrically connected between the first tap and the sliding brush. The other coil is connected between the ungrounded terminal of the current source and ground in series with a resistor, the resistance of which is adjustable for adjusting the angle of the scale of the receiver.

In the preferred form of construction the receiver coils are mounted on an aluminum form which serves as a damping cylinder interposed between the coils and the rotor. The rotor is preferably a right circular cylinder composed of high coercive force material such as sintered oxide described in Patent No. 2,248,616, Faus. The aluminum form or damping cylinder and the coils are surrounded by a hollow cylinder composed of permeable magnetic material to serve as a magnetic shield. Within the cylindrical space defined by the shield a short pull-off magnet, composed of high coercive force material, is mounted with its magnetic axis eccentric with respect to the rotor but transverse to the axis of rotation thereof, and the pull-off magnet is made sufficiently powerful to deflect the rotor to an off-scale position when no current is supplied to the electrical coils, which may happen in case of a power failure. If desired, the scale may be so arranged that the pointer is obscured when the rotor is in the off-scale position in case of power failure, but I prefer to have the pointer visible at all times.

A better understanding of the invention will be afforded by the following detailed description considered in connection with the accompanying drawing, and the features which I consider to be novel and patentable will be pointed out in the claims appended hereto.

In the drawing Fig. 1 is a top view of one embodiment of my invention; Fig. 2 is a sectional view of the arrangement of Fig. 1 representing a section cut by a broken vertical plane 2—2; Fig. 3 is an exploded perspective view of the apparatus of Figs. 1 and 2; Fig. 4 is a circuit diagram of a telemetering system embodying my invention in which a receiver or indicator may be employed of the type represented in Figs. 1, 2 and 3; Fig. 5 is a circuit diagram of a telemetering system showing connections known to those skilled in the art in which the telemetric receiver of Figs. 1, 2 and 3 may be employed, although I prefer the connection of Fig. 4; and Fig. 6 is a circuit diagram of a modification of the arrangement of Fig. 5. Like reference characters are used throughout the drawing to designate like parts. I have referred to Fig. 1 as a "top view," but it will be understood that the apparatus is operable in any position and the use of terminology implying a vertical rotor axis is for convenience only and is intended to include a receiver mounted in any position.

In Figs. 1 to 3 the illustrated receiver or indicator comprises a base 11 composed of suitable insulating material such as fibrous material impregnated with a phenolic condensation product, a combined winding form and damping cup 12 composed of an electrically conducting material such as aluminum, for example, a hollow cylindrical magnetic shield 13 surrounding the damping cup 12 with a space therebetween, a pair of coils 14 and 15 mounted at an angle to each other, with radial magnetic axes, in the space between the damping cup 12 and the magnetic shield 13, a top bridge 16, which may be composed of magnetically permeable material closing the top of the magnetic shield 13, and a rotor 17 mounted within the damping cup 12 having an axis of rotation substantially concentric with the damping cup and the magnetic shield. If the top bridge 16 is composed of material which is magnetically permeable in order to provide magnetic shielding additional to that provided by the cylindrical shield 13, a magnetic shield plate (not shown) may also be mounted at the bottom of the shield 13 or under the damping cup 12 against the base 11. Good results are obtained by making the angle between the coils 14 and 15 about 140°, but this angle may be varied to obtain different angular scale lengths. The rotor 17 is a permanent magnet which is preferably composed of a high coercive force material having a definite line of polarization which is not readily changed in any direction such as described in the aforesaid Faus patent. Preferably the rotor 17 consists of a cylinder which is transversely magnetized carried by a spindle 18 having suitable pivots or journals 19 and 20 at the ends cooperating with suitable bearings.

The lower bearing may consist of a conventional jewel screw 21 screwed into the base of the damping cup 12, held in adjustment by a lock nut 22 and carrying a cup jewel 23 at the upper end thereof cooperating with the rotor pivot 20. The upper bearing may consist of a bridge bushing 24 composed of a non-magnetic material such as brass or bronze, for example, pressed into a center opening in the top bridge 16 and having a contracted throat portion 25 (Fig. 2) serving as a ring bearing to cooperate with the upper journal.

An indicating pointer 26 may be mounted at the upper end of the journal 19 to cooperate with a graduated arcuate scale 27. For enabling indications of power failure to be observed when the pointer 26 is deflected to off-scale position, ample space is provided at the lower end 28 of the scale, which is the region of the scale occupied by the pointer when it is deflected below the zero position.

The damping cup 12 is preferably arranged in spool shape having a flanged base 29, which is solid except for a threaded opening to receive the jewel screw 21, and having an upper flange 30, whereby the hollow cylindrical magnetic shield 13 may be fitted over the damping cup 12 in engagement with the flanged portions 29 and 30, leaving a space 31 for the coils 14 and 15. For supporting these coils preferably projections 32 and 33 are formed in the damping cup 12. It will be understood that suitable openings are provided in the damping cup 12 for electrical conductors leading to the coils 14 and 15. For example, a pair of insulating bushings 34 and 35 (Fig. 3) may be mounted in openings in the lower flange 29 registering with corresponding openings (not shown) in the insulating base 11 which has channels (not shown) connecting with cavities for terminals 36 and 37. Likewise a pair of insulating bushings is mounted on the other side in the lower flange 29 for carrying leads to a second pair of terminals 38 and 39.

In order to maintain the magnetic shield 13 in a predetermined angular position and thus guard against possible changes of calibration in the event of lack of perfect concentricity of mounting and uniformity of construction of the magnetic shield, a notch 40 is provided in the lower end of the magnetic shield. A projecting lug 41 is formed at one side of the flanged base 29 of the damping cup 12 to register with the notch 40. Notches 42 may also be provided in the upper flange 30 to register with tapped holes 43 in the top bridge 16. The tapped holes 43 are adapted to receive scale-supporting screws (not shown).

The top bridge 16 is secured to the damping cup 12 in any suitable manner as by means of screws 45 to hold the magnetic shield 13 in place. The shield 13 in turn holds the coils 14 and 15 in place on the projections 32 and 33. The magnetic shield 13 may be composed of any suitable high permeability magnetic material such as that known as Mu-metal, for example.

The coils 14 and 15 consist of flat wire-wound spools formed by cementing acetate films 46 and 47 (Fig. 3) to annular cores 48 (Fig. 2) to form flat spools on to which wire 49 is wound to form a flat coil, which is thereafter hot molded under pressure in the curved form shown in Fig. 3. If desired kraft paper insulation 50 (Fig. 2) may be provided between the damping cup and the coils 14 and 15 on the one hand and the magnetic shield 13 on the other hand.

It will be observed from the drawing that the bridge bushing 24 is held in place in the opening in the top bridge 21 by fitting the bushing into the top bridge and in effect peening over the upper edge 51 of the shoulder on the bridge bushing 24.

As shown the bushing 24 has a downwardly extending enlarged portion 52 in the shape of a square with the corners beveled. A pull-off field for pulling the pointer off-scale in case of power failure is provided by means of a short permanent magnet 53 occupying a transverse hole cut in the square portion 52 of the bushing 24. The magnet 53 is composed of material which has a relatively high coercive force and a relatively low operating permeability (not initial permeability). The high coercive force assures adequate magnetic field for the intended purpose in spite of the short length of the magnet and the low permeability guards against the rotor 17 inducing flux in the magnet 53 taking up an angular position 180 degrees from that which it is intended to have under the action of the pull-off magnet 53 when the current supply in the coils 14 and 15 is cut off. Thus the permanent magnet field of the magnet 53 acts with the permanent magnet field of the rotor magnet 17, but the rotor 17 does not produce any appreciable induced polarization of the magnet rod 53 which might cause the rotor 17 to take up a position 180 degrees from that which it would tend to take up by reason of the permanent magnet field of the magnet 53.

Pull-off magnets composed of 36 per cent cobalt steel, relatively long, and mounted relatively far from the rotor to avoid strong induced magnetization have been used in instruments not having a small magnetic shield. When a magnetic shield is employed the pull-off magnet must be inside the shield. In the case of a compact instrument with a small shield, particularly, the pull-off magnet is brought very close to the permanent magnet rotor and must be very short. The result is that, even in the case of the usual high-coercive force permanent magnet alloys, the magnetic pole strength induced in the pull-off magnet by the field of the permanent-magnet rotor becomes large in comparison with the magnetic pole strength of the pull-off magnet due to its own permanent magnetism. For proper operation of the instrument, however, the permanent magnet flux of the pull-off magnet should be substantially greater than that induced in it by the rotor. Consequently, I utilize a special material for the pull-off magnet 53. I have successfully used a low permeability permanent magnet material such as an alloy of approximately 50 per cent copper, 20 per cent nickel, and 30 per cent iron or a similar alloy in which 2½ per cent cobalt replaces so much iron, heat treated to give high coercive force as described in Patent No. 2,196,824, Dahl. Thirty-six per cent cobalt steel has a coercive force of approximately 210 oersteds, a residual magnetization of 9,600 gausses and a maximum permeability of 35. In contrast, the aforesaid copper-nickel-iron-cobalt alloy has a coercive force of 290 and a residual magnetization of 7350. I do not know its maximum permeability but assume that it is of the same order of magnitude as that of the aforesaid copper-nickel-iron alloy which has a maximum permeability of approximately eight and values of coercive force and residual magnetization comparable with those of the heat-treated alloy including 2½ per cent cobalt.

With the proportions of parts and spacings shown in the drawing and using either of the preferred heat-treated alloys which I have mentioned for the pull-off magnet 53, the flux induced in the pull-off magnet by the rotor is about one quarter of the flux due to the permanent magnetization of the pull-off magnet.

The damping cup 12 has formed integral therewith a sub-base 54 with ears 55 facilitating attachment to the insulating base 11 by means of eyelet rivets 56.

My construction lends itself to the production of very compact light-weight high-torque units. My invention is not limited to indicators of a particular size and rating. However, it may be mentioned that telemetric indicators giving very satisfactory performance and having a torque as high as four or five hundred milligram-centimeters may be constructed with a shield diameter of no greater than five-eighths inch and a rotor diameter no greater than five-sixteenths inch in a construction such as illustrated in the drawing.

If the indicator of Figs. 1 to 3 is utilized in a telemetering system of the type represented by Fig. 5, the coils 14 and 15 are connected as shown in series between the positive terminal 57 and the negative or grounded terminal 58 of a source of current with a current-limiting protective resistor 57', preferably connected in the positive lead. This is the conventional connection, but my invention is not limited to grounded systems or to the polarity of terminals specified. A junction terminal 59 of the coils 14 and 15 is connected to a sliding brush 60 adapted to move along a resistor 61 which is also connected to the current source 57, 58 in series with the resistor 57'. For adjustment of the position of the end points of the transmitter scale, i. e., to provide for different limits of travel of the brush 60 when the same model transmitter is adapted to use with a movable float in different tanks, e. g., when the telemetering system is used as a remote indicating float gauge, the connection of the resistor 61 to the current source 57, 58 may be made adjustable by means of movable taps 62 and 63. As the brush 60 is caused to slide along the resistor 61, it varies the relative voltages applied to the coils 14 and 15 and therefore the relative currents, so that the rotor 17 takes up a position depending upon the relative magnitudes of the fluxes produced by the currents flowing in the coils 14 and 15. Accordingly, the pointer 26 deflects to a position indicative of the position of the brush 60. In case a break should occur in the conductor 64 between the coil junction terminal 59 and the sliding brush 60, the coils 14 and 15 will carry the same current and the rotor would take up a fixed position which under ordinary circumstances is the mid scale position regardless of the position of the brush 60. The length of the scale angle of the indicator, that is, the angular distance from the zero point 65 to the full scale point 66 (Fig. 3) is determined by the angles between the coil holding projections 32 and 33 on the damping cup 12. The preferred angle is about 140 degrees. Different angles may be provided by utilizing different damping cups for instruments intended to have different lengths of scale, or by shifting the position of the locating hole in coils 14 and 15.

The modified arrangement of Fig. 6 may be employed in which an open circuit in the brush connection or a poor contact between the brush 60 and the resistor 61 causes current failure and thus allows the rotor 17 to take up a position determined by the angular position of the pull-off magnet 53 in which position the pointer 26 is moved off scale and thus no false indication is produced. It will be observed that in the arrangement of Fig. 6 the junction terminal 59 of the coils 14 and 15 is connected to the positive side 57 of the current source and the brush 60 is grounded so that the coils 14 and 15 form branch circuits. Thus when the brush 60 is at one end of the scale, for example, adjacent the transmitter scale end adjustment tap 62, one of the coils, in this case the coil 14, is connected directly across the current source 57, 58 whereas the other current coil 15 is connected in series with the transmitter resistor 61. It stands to reason that the angular position of the pointer under these circumstances at either end of the scale, in this case the zero end, depends upon the resistance of the portion of the resistor 61 between the taps 62 and 63.

Apparatus of this kind is frequently used in connection with float gauges for tanks in which the brush 60 is connected through a linkage 67 to a float 68 which rises and falls according to the level of liquid in a tank 69. Since the angular movement of the brush produced by floats acting in different tanks varies, the taps 62 and 63 are made adjustable so that they may be moved opposite the points at which the brush 60 rests when the float is at the empty and full tank positions respectively. For example, the same float linkage and transmitter resistor arrangement might be employed for the tank 69 having top and bottom walls 70 and 71, or a different tank having its top and bottom walls at the positions of the dotted lines 72 and 73. Since the adjustment of the taps 62 and 63 to different tank dimensions changes the resistance in series with the coils 14 and 15 at the end scale points, the calibration and scale length of the indicator depend upon the physical arrangement of the tank with which the float gauge telemetering system is used. The variation in scale length of the indicator may be reduced by continuing the resistor 61 around the full circle by providing a portion 65 as shown in dotted lines in Fig. 6.

The scale length of the receiver or indicator may be made independent of variations in the transmitter resistance by employing the arrangement illustrated in Fig. 4. In this case a transmitter resistor 61 is again employed having a sliding brush 60 and taps 62 and 63, adjustable to provide for different limits of travel of the transmitter-actuating mechanism such as the float or linkage 67—68. The resistor 57' in the positive lead to the current source terminal 57 is provided and the indicator coil 14 is connected in series with the sliding brush 60 and the positive lead through the resistor 57'. The transmitter scale adjustment tap 62 is also connected in series with the resistor 57' to the positive source terminal 57. Thus the coil 14 forms a circuit between points 62 and 60 on the resistor 61. The second coil 15 is connected in a circuit between the positive and negative terminals 57 and 58 of the current source. For adjustment of the angular length of the receiver scale 27 a resistor 66, the resistance of which may be varied, is connected in series with the coil 15.

Movement of the brush 60 along the resistor 61 will produce variations in the voltage drop in the coil 14 and therefore cause variations in the flux strengths of the coils 14 and 15, causing deflection of the rotor 17 in accordance with movement of the brush 60. The end position of the receiver pointer 26 at the zero-end of the scale is determined solely by the angular position of the current-conducting coil 15, for when the brush 60 is at the position of the tap 62 no current flows in the coil 14. Preferably, the scale is marked so this end-scale position is a little to the left of the zero mark, so that the pointer stands at zero when the brush 60 is a little to the right of the tap 62. A break in the connection to the brush 60 or a poor contact cannot cause any false indication of a partially filled tank, for example, because in this case the rotor will take up the position determined by the coil 15, viz: a position below the zero position. In the case of a complete power failure or a break in the current-source connections 57, 58, also the pointer 26 will be deflected below the zero position to the scale end 28 by the pull-off magnet 53.

Adjustment of the length of the scale 27 of the indicator may be made by varying the resistance of the resistor 66 because the rotor position is determined by the relationship between currents in the coils 14 and 15 when the brush is at the transmitter position of the tap 63. Preferably the full-scale mark is a little to the left of the point corresponding to the position of the tap 63. Current in the coil 15 does not depend upon the resistance of the resistor 61 and therefore the length of scale of the indicator is independent of any variations in its transmitter resistance.

Changes in the transmitter resistance also have relatively little effect on the shape of the calibration curve. Actually the shape of the calibration curve is nearly a simple segment of a circle, and with proper transmitter resistance as determined by the constants of the coils 14 and 15 of resistor 66 and by pull-off magnet strength becomes a straight line within about one degree. Such a result is obtained, for example, with a 120 degree scale angle, when the constants, stated by way of illustration and not by way of limitation, are as follows:

Resistance between taps 62 and 63___ohms__ 400
Resistance of resistor 66_____do____ 400
Resistance of coils 14 and 15, each____do____ 205
Pull-off torque equalling one-eighth the average coil torque.
Average coil torque_____gram mm__ 4

The scale linearity may also be affected by the arrangement of the shield 13 if it has any eccentricity, or if it is not perfectly circular. The shield effect is explained more in detail in my copending application, Serial No. 472,317, filed January 14, 1943. The scale may be compressed at either end or made substantially linear, by variation in the constants. However, a two to one change in transmitter resistance has comparatively little effect. Accordingly, with the average value chosen for a linear calibration, the angular spread between the taps 62 and 63 may be changed over wide limits, viz: from about 90 to 240 degrees to take care of different brush movements produced by floats in different tanks without serious departure from straight line calibration of the indicator. Furthermore, since the current in each of the coils 14 and 15 is independent of the current in the other coil the operation of the apparatus and the torque characteristics of the indicator may readily be predicted by graphical methods.

I have herein shown and particularly described certain embodiments of my invention and certain methods of operation embraced therein for the purpose of explaining its practice and showing its application, but it will be obvious to those skilled in the art that many modifications and variations are possible, and I aim therefore to cover all such modifications and variations as fall within the scope of my invention which are defined in the appended claims:

What I claim as new and desire to secure by Letters Patent of the United States is:

1. An indicator comprising a damping cup composed of electrically conducting material, a hollow shield composed of magnetic permeable material surrounding the cup and spaced therefrom, electrically conducting coils with radial magnetic axes fitted between the damping cup and the magnetic shield, a rotor rotatably mounted within the damping cup, and electrical connections to the coils whereby variations in the relative current strengths in the coils produce variations in the resultant direction of the magnetic field produced by the coils and thereby produce a deflection of the rotor, the rotor comprising a magnet magnetized in a direction transverse to its axis of rotation.

2. An indicator such as described in claim 1 having a relatively short bar magnet mounted within the space defined by the magnetic shield for biasing the magnetic rotor to a predetermined position in case of failure of current supplied to the coils.

3. An indicator such as described in claim 1 having a relatively short bar magnet mounted within the space defined by the magnetic shield and transverse to the axis of rotation of the rotor for biasing the magnetic rotor to a predetermined position in case of failure of current supply to the coils, said bar magnet being composed of a material having a coercive force substantially as high as that characteristic of an alloy of 50 per cent copper, 20 per cent nickel, and 30 per cent iron, with a permeability substantially as low as that characteristic of such an alloy.

FREDERICK R. SIAS.